Figure 1:
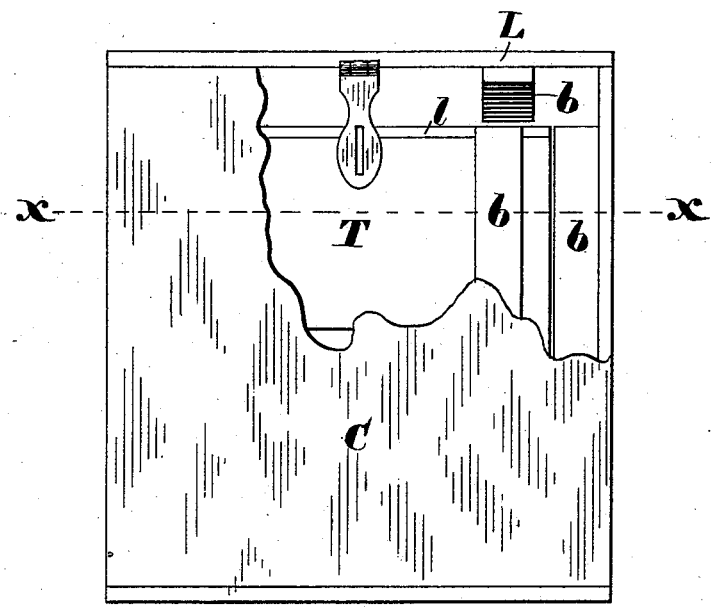

(No Model.)  2 Sheets—Sheet 1.

J. F. TORRANCE.
PROCESS OF PRESERVING FRUIT.

No. 340,389. Patented Apr. 20, 1886.

Witnesses:

Inventor:
John F Torrance
by his Attorney
Wm S Rogers (No Model.) 2 Sheets—Sheet 2.

J. F. TORRANCE.
PROCESS OF PRESERVING FRUIT.

No. 340,389. Patented Apr. 20, 1886.

Witnesses:

Inventor:
John F. Torrance
by his Attorney
Wm S Rogers

UNITED STATES PATENT OFFICE.

JOHN FRASER TORRANCE, OF MONTREAL, QUEBEC, CANADA.

PROCESS OF PRESERVING FRUIT.

SPECIFICATION forming part of Letters Patent No. 340,389, dated April 20, 1886.

Application filed March 15, 1886. Serial No. 195,305. (No model.) Patented in Canada February 13, 1886, No. 23,409.

*To all whom it may concern:*

Be it known that I, JOHN FRASER TORRANCE, of Montreal, Province of Quebec, Canada, have made a new and useful invention in the Art of Preserving Fruit, of which the following is a specification.

My invention consists in the use and application of infusorial or of foraminiferous earth in the preservation of fruit, food, and other substances to which the same may be applicable. This earth consists of the fossil remains of infusoria and of foraminifera, and, although of microscopic size, is said to be composed of minute shells holding within themselves a minute particle of air. Such earth has been extensively used for covering boilers and steam-pipes to prevent the radiation and loss of heat. It is also used as a polishing-powder. The effectiveness which I have found it to possess in the preservation of fruits in their natural state I believe to be owing to the peculiar efficacy of this earth in protecting the fruit from changes of temperature and by shutting out any moisture from outside and by keeping in the moisture of the fruit itself—that is, by keeping up an equable temperature in the fruit itself and by maintaining the normal humidity in the fruit—that the fruit may be preserved in its natural state without decay and without shriveling or drying up for a longer period than by other modes in use.

The articles to be preserved may be packed in an ordinary box or barrel containing a sufficient supply of the earth without partitions or trays, in the same manner as "Malaga" grapes are packed in cork-waste in the original packages in which they are commonly imported; but I prefer a construction which, as shown in the drawings, will practically insure the insulation of the fruit by the earth from contact with the outer case.

Figure 2:
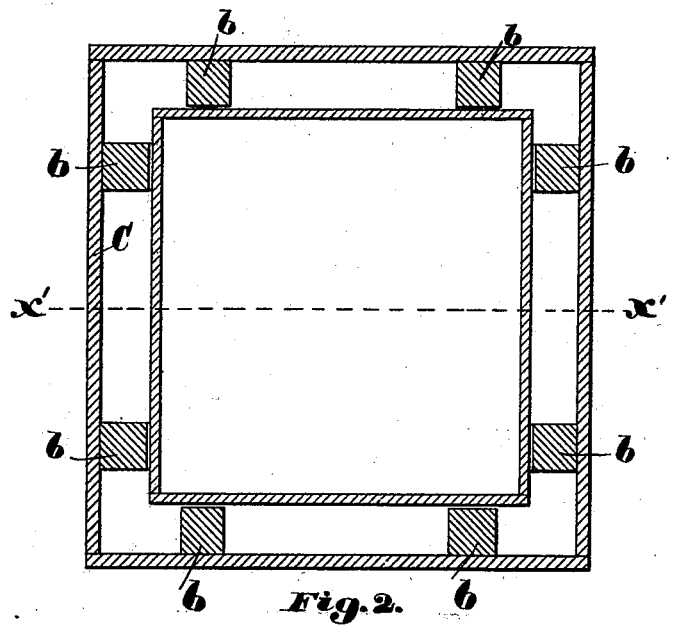
Figure 3:
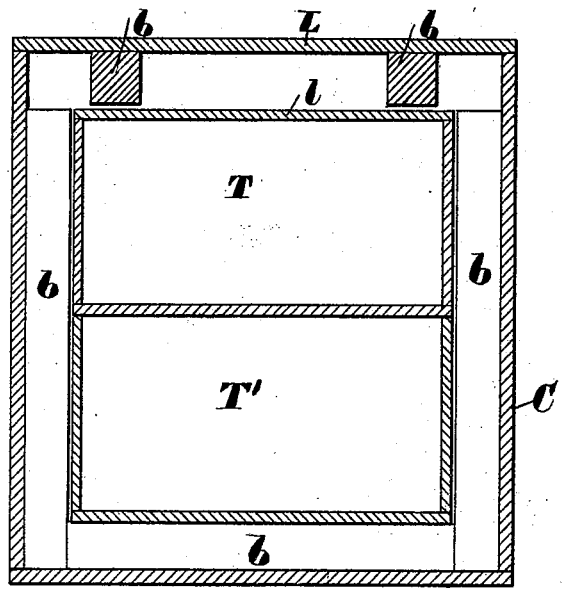

Figure 1 of said drawings is an elevation of a box or case adapted to the use of my invention, the front face being broken away in order to expose the interior. Fig. 2 is a view of the case in horizontal section on the line $x\,x$ of Fig. 1. Fig. 3 shows a vertical section on line $x'\,x'$ of Fig. 2.

C is the box or case, provided with battens or slats $b$ on the inner face of the four sides, the bottom, and lid L. These slats are about an inch thick, and their purpose is to support the inner box or trays, T T', on all sides, and chiefly to insure a space surrounding said inner box or trays, T T', to receive the infusorial earth.

In use the bottom of the case is covered with a layer of infusorial or of foraminiferous earth to a level with the two battens $b$, with which the bottom is provided. Then the tray T', after it is packed with fruit, is placed in the box C, resting on the battens, as shown in Fig. 3. The fruit or other articles, if of sufficient size, are preferably first wrapped in paper and then placed in the tray with an intermixture of the earth to fill all the interstices. The tray T is filled in the same manner and placed upon the top of tray T' in the case. It is then covered by its lid $l$. All the remaining space between the trays and the inner walls of the case is now filled with the earth, and the cover or lid L of the case is finally put on and fastened.

I claim—

The method of preserving fruit and other substances, as herein described, which consists in surrounding the same with infusorial or foraminiferous earth, substantially as set forth.

JOHN FRASER TORRANCE.

Witnesses:
THOMAS PORTEUR,
*Of Montreal, Clerk.*
WILLIAM M. LENNAN,
*Of Montreal, Notary Public.*